Aug. 21, 1923.

E. T. CURRAN 1,465,544

RADIATOR CAP

Filed Oct. 8, 1921

INVENTOR.
Edward T. Curran
BY Jas. H. Griffin
ATTORNEYS.

Patented Aug. 21, 1923.

1,465,544

UNITED STATES PATENT OFFICE.

EDWARD T. CURRAN, OF DETROIT, MICHIGAN.

RADIATOR CAP.

Application filed October 3, 1921. Serial No. 506,270.

*To all whom it may concern:*

Be it known that I, EDWARD T. CURRAN, a citizen of the United States, residing at Detroit, in the county of Wayne and State of Michigan, have invented certain new and useful Radiator Caps, of which the following is a specification.

This invention is a radiator cap adapted to be used, on automobile radiators, and so constructed as to support a radiator thermometer in a manner to preclude either the theft of the thermometer or of the radiator cap.

An extensive practice has developed in recent years on the part of automobile owners in providing radiator caps of artistic and æsthetic designs, which, in many instances, are expensive, and, because of their attractive appearance, are not infrequently removed and stolen from the car, more particularly by boys. Moreover, radiator caps of conventional kinds are frequently provided with radiator thermometers, so constructed that they may be readily removed by unauthorized persons and form a temptation for thieves. A large number of these radiator thermometers are stolen yearly.

With the foregoing considerations in mind, the objects of the present invention may be referred to as two-fold, namely, to provide an ornamental and æsthetic radiator cap, which may be so constructed that it may be readily locked in place upon the radiator filler neck to preclude its removal by unauthorized persons, and, furthermore, the construction of the cap in such manner that a radiator thermometer may be securely locked in position thereon to preclude its removal from the cap.

Speaking generally, the invention consists of a radiator cap, which may be screwed on the filler neck of the radiator in the usual manner and may be thereafter locked in place upon said neck by means concealed by a pivoted cover with which the cap is provided. The cap may be further constructed to form a support for a radiator thermometer which may be locked to the cap by means also concealed by the cover when the same is in closed position and with these parts are associated key actuated means for normally locking the cover of the cap in such closed position.

It is the normal intention to employ a radiator thermometer in conjunction with the cap of this invention, though, if desired, ornaments, totems or emblematic structures may take the place of the thermometer and may be locked in position to preclude the theft thereof.

Features of the invention, other than those specified, will be apparent from the hereinafter detailed description and claim, when read in conjunction with the accompanying drawings.

The accompanying drawings illustrate one practical embodiment of the invention, but the construction therein illustrated is to be understood as illustrative, only, and not as defining the limits of the invention.

Figure 3:
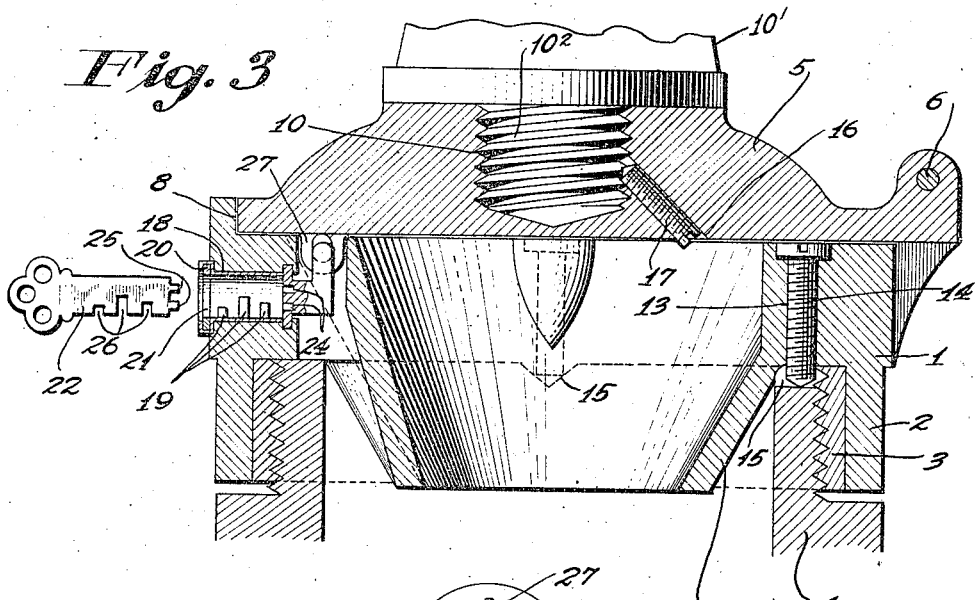
Figure 3 is a section on the line 3—3 of Figure 1, showing the cap mounted on the filler neck of a radiator, which is also shown in section; and, Figure 4 is a perspective view of a hook shaped locking member which may be conveniently employed in the construction shown in the other figures.
Figure 2:
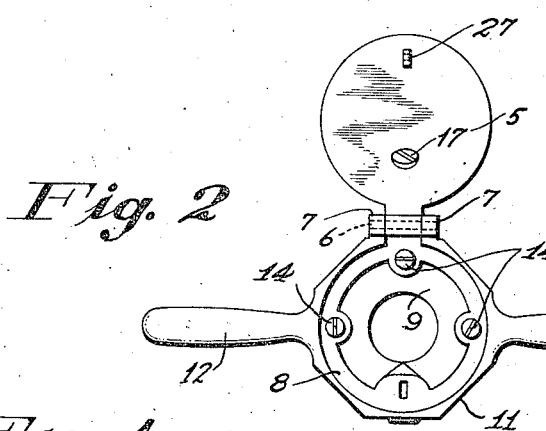
Figure 2 is a plan view of the radiator cap with the cover plate thereon open.

Referring to the drawings, 1 designates the radiator cap, which may be cast or molded in metal, fibre, composition or other material, but is preferably cast of aluminum. The cap 1 is provided with a tubular depending skirt 2, in which is positioned a tubular liner 3 of brass seated or otherwise firmly secured in position. If desired, the threads may be formed directly upon the interior of the skirt 2, but as aluminum threads are not durable, it is preferred to use the brass liner in the event that the cap is in the form of an aluminum casting. The threads thus formed adapt the cap to be screwed upon the threaded filler neck 4.

The cap is provided with an open top which is preferably normally closed by a hinged cover 5 pivoted on a hinged pin 6, supported by lug 7, cast integral with the cap proper. The cover 5 is adapted to seat within a depression or recess 8 in the top of the cap when in closed position. When the cover is raised and swung back, water may be introduced into the radiator through a central passage through the cap and to facilitate the passage of such water into the radiator, the interior wall of the cap being preferably funnel shape and is extended downwardly by a downwardly converging apron or skirt 9.

The cover plate 5 is preferably provided in the center of its top with a tapped pocket 10, adapted to receive a threaded shank of a radiator thermometer or a radiator cap ornament, though, if desired, this threaded pocket may be omitted and an ornament formed directly upon the cap or the top of the cover plate may be made plain.

Figure 1:
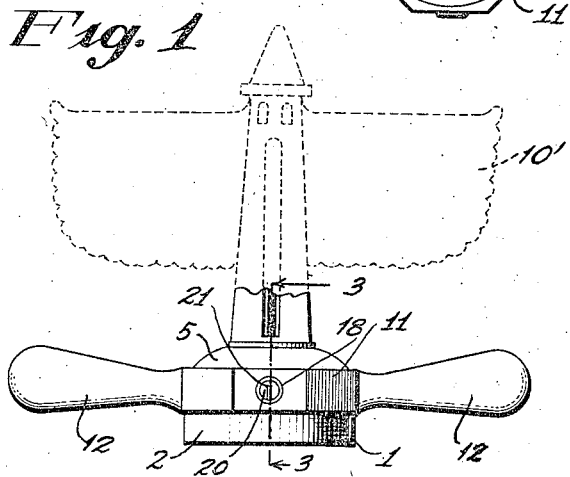
Figure 1 is a front elevation of a radiator cap embodying the present invention showing the radiator thermometer illustrated partly in dot and dash lines mounted thereon.
Figure 4:
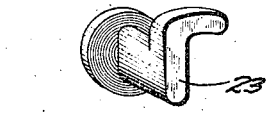

An important feature of the present invention as hereinbefore stated resides in the fact that means are provided for locking the cap against removal by unauthorized persons from the radiator filler neck and also locking the thermometer or ornament against removal from the cap. In practice, the cap itself is preferably made ornamental, and, as shown in Figure 1, the exterior of the cap may be made æsthetic by forming the upper portion thereof of polygonal contour, as shown at 11, and providing the same with outwardly extending radial arms 12, which not only enhance the appearance of the cap, but, also, facilitate the screwing of the cap on to or off of the filler neck of the radiator. The cap may be conveniently locked against unauthorized removal by providing said cap with one or more holes 13, which extend downwardly through the top of the cap from the base of the recess 8 to a point above the upper edge of the filler neck and by threading these holes so that said screws 14 may be screwed downwardly therethrough and into engagement with the upper edge of the filler neck, after the cap has been screwed thereon. If desired, notches 15 may be formed in the upper edge of the filler neck, so that when the screws 14 are screwed downwardly through the holes 13, their lower ends may engage the notches 15 and positively lock the cap against rotation on the filler neck.

By positioning the screws 14, as shown and countersinking or letting in their heads, the heads of the screws will be covered and concealed by the cover 5, when the same is folded into the closed position shown in Figure 3, and set screws will accordingly be inaccessible so long as the cover remains closed.

If a radiator thermometer or ornament is to be associated with the cover of the cap, by screwing the threaded shank of the thermometer or ornament into the associated pocket 10 of the cover the shank of said thermometer or ornament may be locked against rotation in the pocket by providing the cover with a tapped hole 16, extending upwardly from the under side thereof and at an angle so as to intersect the pocket. The hole 16 is threaded and a set screw 17 is adapted to be screwed into the hole 16 and thereby caused to engage the threaded shank of the ornament or thermometer after the same has been screwed into the pocket 10 and to so bite into the threads of such shank as to preclude the removal of the thermometer or ornament so long as the set screw is in place.

It will be apparent that the locking of the cap on the radiator filler neck, as well as the locking of the thermometer or ornament upon the cover of the cap, is dependent upon the maintaining of the cover in closed position and in order to assure of this a lock is preferably associated with the cap and cover and is controllable by a key, so as to preclude the opening of the cap and the releasing of the set screws 13 and 17 by unauthorized persons. This lock may be of any suitable and conventional form, but the simple form of lock illustrated in the drawings is found to operate with entire satisfaction and efficiency.

In the form of lock shown, the lock casing 18 is let into the cap and is provided interiorly with suitably shaped and positioned wards 19. The front of the casing is closed by a rotatable plate 20 provided with a slot 21, through which a key 22 may be introduced. Associated with the inner end of the lock casing is a hook member 23, which is mounted for rotation coaxial with the lock casing 18 and is provided on its forward face with off center holes 24, corresponding in placement to projections 25 formed on the end of the key. The key is adapted to be inserted into the lock casing through the slot 21 and the projections 25 brought into engagement with the pockets 24 of the hook shaped member 23. The key is provided with ward openings 26 corresponding in placement to the wards 19 and of corresponding size, so that when the key is brought into the position described, it may be rotated for the purpose of rotating the hook shaped member 23 into and out of engagement with a keeper 27, depending from the under side of the cover 5, so that through these operations the cover may be locked or unlocked in closed position. The form of lock illustrated is of very simple construction, embodies a minimum number of parts and may be manufactured at a minimum cost, and while it is not a burglar proof lock in the usual meaning of the term, it is sufficiently protective to adequately carry out its purpose of precluding boys or other petty thieves from stealing the radiator cap or thermometer or ornament associated therewith. I wish it understood that any other locking means than that described may be employed if so desired in lieu of the construction shown. It will be apparent in any event so long as the cover is locked in closed position that the surreptitious removal of the cap or thermometer is precluded.

In practically carrying out the invention, set screws have been found to efficiently lock the parts with which they are associated against inadvertent removal, but other locking means may be employed in lieu thereof if so desired.

The cap of the present invention is adapted to be placed upon the radiator filler neck of a car and when once positioned and locked in place thereon may become a permanent part thereof. When it is desired to replenish the water in the radiator, the key 22 is employed to unlock the cover and allow it to be swung back so that water may be poured through the funnel shaped interior of the cap and into the radiator. This funnel shaped interior greatly facilitates the introduction of the water, and, moreover, assists in precluding splashing of the water in the radiator out through the joint beneath the plate. Moreover, by setting the cover in the recess 8 a stepped joint is provided which further precludes splashing of the water or leakage of the same through said joint beneath the cover.

The cap of the present invention is adapted for general use on all makes of automobiles provided with a water cooling system. It is simple in construction, relatively economical to manufacture and highly aesthetic and pleasing in appearance. The body of the cap may be varied in design without departing from the spirit of the invention and any form of radiator thermometer may be employed in conjunction therewith except that in such thermometers as extend into the vapor space in the top of the radiator, the pocket 10 will be extended to reach entirely through the cover plate 5 instead of being formed merely as a threaded pocket after the manner shown in Figure 3.

I am aware that changes in form and detail may be made in the construction of the present invention as described in the specification and set forth in the drawings, and, accordingly, the invention is not to be understood as limited to the detailed construction advanced. It is to be understood that the invention is capable of being changed by the substitution of equivalents and is to be construed as broadly novel as is commensurate with the appended claim.

Having thus fully described the invention, what I claim as new and desire to secure by Letters Patent is:

A radiator cap adapted to be screwed on to the filler neck of a radiator and provided with a passage through which water may be introduced into the radiator, a closure adapted to normally seal the passage, and means for locking the closure in sealing position, in combination with a set screw threaded through the cap with its head underlying and concealed by the closure when the latter is in sealing position and the end of which set screw is adapted to engage with or enter a depression in the upper edge of the filler neck, whereby, said set screw locks the cap against removal from the filler neck and access to said set screw by unauthorized persons is precluded when the closure is locked in sealing position.

In testimony whereof I have signed the foregoing specification.

EDWARD T. CURRAN.